United States Patent [19]

Bucker et al.

[11] Patent Number: 4,970,699

[45] Date of Patent: Nov. 13, 1990

[54] METHOD FOR COLOR MAPPING GEOPHYSICAL DATA

[75] Inventors: Rhoda H. Bucker; Kurt J. Marfurt, both of Tulsa; Timothy D. Stanley, Broken Arrow, all of Okla.

[73] Assignee: Amoco Corporation, Chicago, Ill.

[21] Appl. No.: 310,446

[22] Filed: Feb. 13, 1989

[51] Int. Cl.$^5$ ............................................. G01V 1/34
[52] U.S. Cl. ...................................... 367/70; 340/701
[58] Field of Search .................. 367/70; 340/701, 703, 340/704

[56] References Cited

U.S. PATENT DOCUMENTS

| | | | |
|---|---|---|---|
| 3,662,325 | 5/1972 | Savit | 367/70 |
| 4,279,026 | 7/1981 | Lambright et al. | 367/70 |
| 4,467,461 | 8/1984 | Rice et al. | 367/70 |
| 4,633,447 | 12/1986 | Bodine | 367/70 |
| 4,661,935 | 4/1987 | Shock et al. | 367/70 |
| 4,757,480 | 7/1988 | Gutowski | 367/63 |
| 4,843,599 | 6/1989 | Bucker | 367/70 |

FOREIGN PATENT DOCUMENTS 54809 10/1974 Australia .

Primary Examiner—Ian J. Lobo
Attorney, Agent, or Firm—Timothy D. Stanley

[57] ABSTRACT

The present invention relates generally to a method for color mapping geophysical data. More particularly, the present invention provides a method for combining two or more components of multicomponent geophysical data, so as to produce unique color displays of the combined components of the multicomponent geophysical data.

10 Claims, 14 Drawing Sheets

METHOD FOR COLOR MAPPING GEOPHYSICAL DATA

BACKGROUND OF THE INVENTION

The present invention relates generally to a method for color mapping geophysical data. More particularly, the present invention provides a method for combining two or more components of multicomponent geophysical data, so as to produce unique color displays of the combined components of the multicomponent geophysical data.

Color mapping of data involves a series of transformations employing a color coordinate system. Color mappings of geophysical data typically employ a one-dimensional color coordinate system wherein variations in one component of the geophysical data can be represented by varying shades of a selected color or by a spectrum of colors assigned to represent variations in the geophysical data. In fact, color mappings of geophysical data have generally plotted only the positive values of the geophysical data. Unfortunately, geophysical data sets are typically not limited to data having only positive values or data for which it is informative to represent both positive and negative values as scalar data by use of an offset. Exemplary of such geophysical data are seismic traces recorded during geophysical exploration which represent the earth's response to seismic energy imparted therein. Seismic traces represent one-dimensional data and are generally depicted in either the time-domain or frequency domain. Such seismic traces are complicated sinusoids having both positive and negative values. To more accurately interpret such seismic traces, knowledge of more than either positive or negative values is generally needed.

Because of the difficulty in uniquely mapping both the positive and negative measures of seismic traces, present color displays generally map only positive values of the seismic trace which can be decidedly biased or aliased in their representation of the complete seismic trace. Exemplary of such coloring mapping schemes are those proposed by Savit in U.S. Pat. No. 3,662,325; Lambright, et al., in U.S. Pat. No. 4,279,026; Rice in U.S. Pat. No. 4,467,461; and Anstey in Australian Patent Specification No. 54,809. Other color mapping schemes, such as described by Shock, et al., in U.S. Pat. No. 4,661,935, have been proposed to more accurately portray seismic phase angles. Moreover, none of these color mapping schemes provides a mechanism for uniquely combining two or more components of the multicomponent geophysical data, having both positive and negative values, in a single color display. This shortcoming is indeed unfortunate in view of current advances in geophysical exploration to collect, process and display multicomponent geophysical data.

A first approach to combining two or more components of multicomponent data on a single color display is described by Bucker in commonly owned, copending U.S. Pat. No. 4,843,599. In particular, Bucker describes a novel color coordinate system which is developed from an RGB (red, green, blue) Cartesian color coordinate system. Since the Bucker color coordinate system comprises sets of at least two color axes, mapping components of the multicomponent geophysical data in the Bucker color coordinate system can generally be achieved simply by assigning each component of the multicomponent geophysical data to a separate color axis and multiplication by an appropriate scaling factor. However, for those accustomed to evaluating variations in color in either the more conventional RGB or HLS (hue, lightness, saturation) color coordinate systems, evaluation of color displays employing the Bucker color coordinate system can be more cumbersome.

The present invention provides a method for producing continuous color displays of multicomponent geophysical data sets which overcomes the aforementioned limitations.

SUMMARY OF THE INVENTION

The present invention describes a novel method for color mapping geophysical data. More particularly, a method is provided for combining at least two components of multicomponent geophysical data so as to produce unique color displays of the combined components of the multicomponent geophysical data.

In one embodiment of the invention, a set of color transformations are developed for uniquely mapping multicomponent geophysical data into an HLS color coordinate system. Using the color transformations, at least two components of the multicomponent geophysical data are mapped into the HLS color coordinate system. A chromatic vector can be produced representative of the combination of the components of the multicomponent geophysical data in the HLS color coordinate system. Color displays of the chromatic vector can be produced so as to uniquely represent the combination of components of the multicomponent geophysical data.

In a first color coordinate system, an HLS cylindrical coordinate system is formed and a series of color transforms are developed for mapping two or more components of seismic data, having both positive and negative values, into unique continuous color displays employing chromatic vector addition. As such, a single color display of multicomponent seismic data can be produced which conveys information about the individual character of each component.

As will be apparent from the following detailed description and accompanying drawings, producing displays of selected combinations of the separate components of multicomponent geophysical data can dramatically assist the geophysicist in interpreting the earth's subterranean geological structures.

DETAILED DESCRIPTION OF THE INVENTION

The present invention relates generally to a method for color mapping of geophysical data. More particularly, the present invention provides a unique method for combining two or more components of multicomponent geophysical data in one unique color display.

Figure 1:
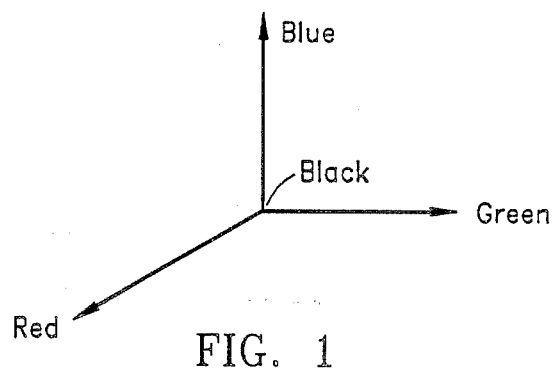
FIG. 1 is a RGB (red, green, blue) color coordinate system.
Figure 2:
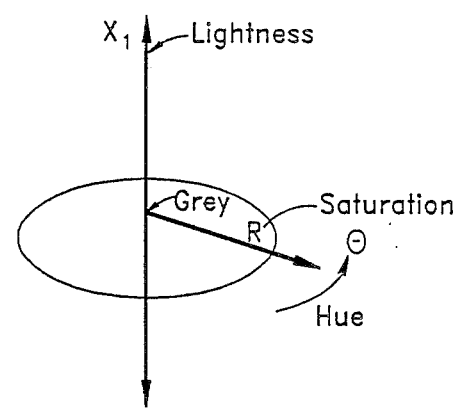
FIG. 2 is an HLS (hue, lightness, saturation) color coordinate system.

As an aid in understanding the present invention, the following introductory discussion is provided. Producing continuous color displays of data requires a color coordinate system and color transformations so as to map the data in the color coordinate system. Conventionally, color coordinate systems have either been RGB, as seen in FIG. 1, or variations of HLS as seen in FIG. 2. Generally, the RGB color coordinate system comprises three mutually orthogonal axes each being assigned one of the colors red, green or blue. The origin of the RGB color coordinate system is black and the intensity of the colors along each axis increases to maximum from the origin. Alternatively, the HLS color coordinate system employs hue, lightness and saturation as components of the color coordinate system. In one embodiment of the HLS color coordinate system, a cylindrical color coordinate system is employed wherein variations in lightness are represented along a first axis $x_1$; variations in hue are represented by an azimuthal angle $\theta$ about the axis $x_1$ and variations in saturation are represented by a radial measure R from the axis $x_1$.

A need exists to provide continuous color displays of geophysical data, such as seismic traces. Seismic traces represent the earth's response to imparted seismic energy and which have complicated sinusoidal variations. In order to maximize the amount of information which can be extracted from seismic traces, knowledge of both positive and negative characteristics of the seismic traces is highly desirable for interpreting the earth's subterranean formations. Unfortunately, typical color displays of seismic data generally represent only the positive characteristics of the seismic trace. Such approach tends to alias the interpretation of the seismic trace when only positive values are depicted and, moreover, provides no basis for combining and uniquely displaying two or more separate sets of seismic data, each having both positive and negative values, on a single display. Conversely, when the geophysical data includes two or more separate components (e.g., multicomponent geophysical data), existing color display methods are inadequate for separately displaying and characterizing each component in the multicomponent geophysical data in a single display.

Figure 3:
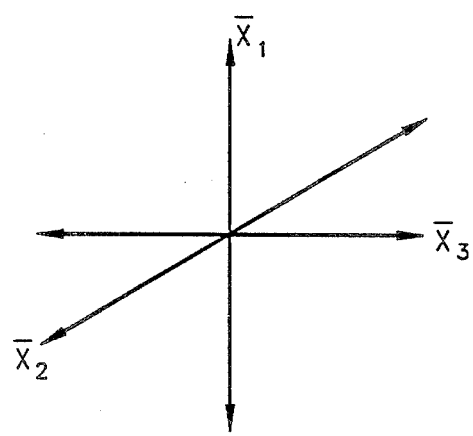
FIG. 3 is a representation of a multicomponent geophysical data coordinate system.
Figure 4A:
FIGS. 4a-f are a sequence of monochromatic representations of multicomponent geophysical data having both compressional and shear wave seismic data.
Figure 4B:
Figure 4C:
Figure 4D:
Figure 4E:
Figure 4F:
Figure 5A:
FIGS. 5a-f are a sequence of color representations of the multicomponent geophysical data of FIG. 4 according to the present invention.
Figure 5B:
Figure 5C:
Figure 5D:
Figure 5E:
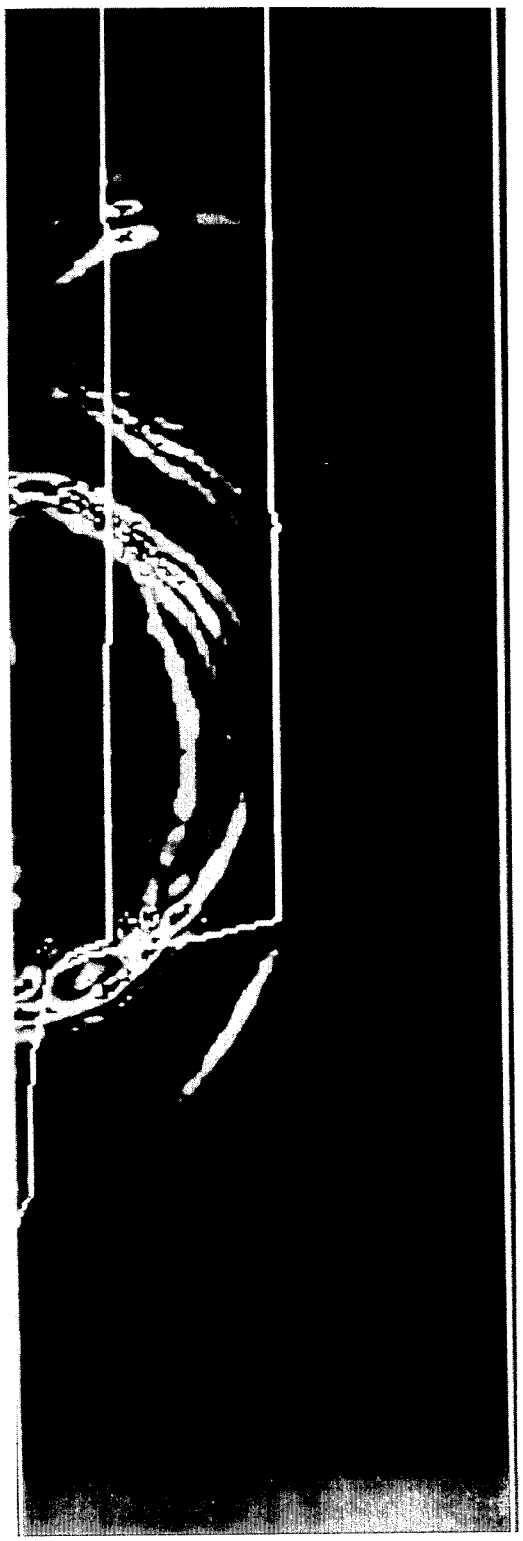
Figure 5F:

In the continuing search for hydrocarbons in the earth's subterranean formations, explorationists have developed geophysical methods (e.g., seismic, magnetotelluric, gravity, etc.) to estimate the location of subterranean hydrocarbon deposits. More recently, explorationists have developed multicomponent seismic data acquisition methods whereby the earth's response to imparted seismic energy can be recorded by two or more sets of sensors each adapted to detect ground motion primarily along separate axes. Those skilled in the art will also appreciate that multicomponent seismic data can include seismic data which contains "converted mode" seismic energy. Simply stated, converted mode seismic data comprises the earth's response to seismic energy which has traveled partly as a compressional wave and partly as a shear wave wherein the conversion from one mode to another can occur upon reflection or refraction with a formation interface. By convention, the separate components of such multicomponent seismic data are referred to as compressional (P), horizontal shear (SH) and vertical shear (SV). The separate components of the seismic data are generally orthogonal. With reference to FIG. 3, the compressional (P) data are recorded by sensors primarily responsive to vertical ground motion along axis $\bar{x}_1$; the horizontal shear (SH) data are recorded by sensors primarily responsive to horizontal ground motion along axis $\bar{x}_2$; and the vertical shear (SV) data are recorded by sensors primarily responsive to horizontal ground motion along axis $\bar{x}_3$. The multicomponent seismic data can thus be represented by a displacement vector $\bar{U}$ according to:

$$\bar{U} = \bar{U}_1 + \bar{U}_2 + \bar{U}_3 \qquad (1)$$

where:
$\bar{U}_1 = a\bar{x}_1$ is representative of displacements along $\bar{x}_1$ axis;
$\bar{U}_2 = b\bar{x}_2$ is representative of displacements along $\bar{x}_1$ axis;
$\bar{U}_3 = c\bar{x}_3$ is representative of displacements along $\bar{x}_3$ axis; and
a, b, and c are scalars having ±values.

Conventional displays of multicomponent geophysical data are generally unsatisfactory. By way of example, FIGS. 4a–f represent monochromatic displays of a set of multicomponent seismic data which includes two components of particle displacement (i.e., compressional and shear). In FIG. 4, variations in the positive amplitudes of the seismic data are represented by variations in the intensity of the color yellow. In particular, FIGS. 4a–f comprise sequential time snapshot views of seismic energy radiating outwardly from a shot location and interacting with a modeled substructure (indicated by the yellow lines). Without additional insight, interpreting the different components of seismic energy propagating through the earth's formations, as depicted in FIG. 4, can be difficult at best.

Looking now to FIGS. 5a–f, color mappings of the multicomponent geophysical data of FIG. 4 according to the present invention are presented. In FIG. 5, the separate components of the multicomponent seismic data are dramatically shown. In particular, variations in the amplitudes of the compressional (P) component of the seismic data are represented by the colors blue (+) and yellow (−), while variations in the amplitudes of the shear (SV) component of the multicomponent geophysical data are represented by the colors magenta (+) and green (−). Intermediate colors can indicate either the simultaneous occurrence of both compressional and shear components of body waves or, equally important, identify seismic noise trains, such as Rayleigh waves and interface waves, having polarizations different from compressional or shear. Differences in hue for one component can represent changes in polarity, while variations in saturation can represent variations in magnitude of each component. Thus, FIGS. 5a–f show clearly both shear and compressional waves. The advantages of the color displays of multicomponent geophysical according to the present invention are thus apparent. As will be explained later since only two components of the multicomponent geophysical data have been combined in a single display, a fixed level of lightness (i.e., gray) has been selected in FIG. 5.

The color mapping of both components of the multicomponent data simultaneously in a single color display conveys information about the independent nature of each component as well as conveying information about their interaction. But for the Bucker method of displaying multicomponent geophysical data described earlier, existing methods of displaying geophysical data are simply inadequate for uniquely displaying multicomponent geophysical data in a single display.

In a preferred embodiment for uniquely mapping multicomponent geophysical data into continuous color displays, an HLS color coordinate system is employed. In particular, an HLS cylindrical color coordinate system as depicted in FIG. 2 is used wherein variations in hue are represented by an azimuthal angle $\theta$ about longitudinal axis $x_1$. Variations in lightness are represented by a distance Z measured from an origin depicted as gray along the axis $x_1$. Lightness changes toward white in one direction along the axis $x_1$ and toward black in the opposite direction. Variations in saturation of hue are represented by a radial distance R measured from the axis $x_1$ whereby the saturation of a selected hue varies from 100% gray at the axis $x_1$ to 0% gray. The Munsell color coordinate system is exemplary of such HLS color coordinate system. Thus, to uniquely locate a position in the HLS cylindrical color coordinate system requires the coordinates ($\theta$, Z, R). However, those skilled in the art will appreciate that the HLS cylindrical color coordinate system is merely an exemplar.

To produce a color display of multicomponent geophysical data, it is first necessary to develop a set of color transformations whereby the multicomponent geophysical data can be mapped into a selected color coordinate system. Moreover, such color transformations should uniquely map both the positive and negative values represented in the multicomponent geophysical data into the color coordinate system. Uniqueness is an important aspect of the color transformations of the present invention so as to preclude the existence of two or more different combinations of the components of the multicomponent geophysical data having the same coordinates in the color coordinate system. Responsive to such criteria, the following color transformations for multicomponent geophysical data into an HLS cylindrical color coordinate system are described:

$$\overline{U}_1 = Z \qquad (2)$$

$$\overline{U}_2 = R \sin \theta \qquad (3)$$

$$\overline{U}_3 = R \cos \theta \qquad (4)$$

where $\overline{U}_1$, $\overline{U}_2$, $\overline{U}_3$ each represent one component of displacement vector $\overline{U}$ of the multicomponent seismic data;

Z, R, $\theta$ each represent coordinates of the HLS color coordinate system; and $$\theta = \tan^{-1} \frac{\overline{U}_2}{\overline{U}_3}$$

$$R = (\overline{U}_2^2 + \overline{U}_3^2)^{1/2}.$$

Using the color transformations of Eq. (2-4), multicomponent seismic data can be mapped into the HLS color coordinate system of FIG. 2. Although three components of the multicomponent geophysical data can be mapped using Eqs. (2-4), such color transformations can also be useful in mapping any two of the components of the multicomponent geophysical data into the HLS color coordinate system. In such case, a fixed value of lightness (Z), corresponding to a selected gray level, is employed, and variations in hue ($\theta$) and saturation (R) are employed to represent variations in the combination of the selected components of the multicomponent geophysical data.

A chromatic vector $\overline{C}$ can be produced in the HLS color coordinate system which is representative of the combination of the separate components of the multicomponent geophysical data mapped in the HLS color coordinate system. The chromatic vector $\overline{C}$ thus conveys information about the combination of the separate components through variations in hue, lightness and saturation and can thus be said to represent a chromatic vector addition of the separate components of the multicomponent geophysical data. The chromatic vector $\overline{C}$ in the color coordinate system can be obtained from the mapping of the multicomponent geophysical data into the color coordinate system according to:

$$\overline{C} = Z + R + \theta \qquad (5)$$

where:

$$R = (\overline{U}_2^2 + \overline{U}_3^2)^{1/2}$$
$$Z = \overline{U}_1$$
$$\theta = \tan^{-1} \frac{\overline{U}_2}{\overline{U}_3}.$$

Although separately displaying each color component of the multicomponent geophysical data can be useful, chromatic vector addition provides means for combining two or more of the components of the multicomponent geophysical data so as to produce a unique color display of the combined components while still conveying information about the identity of each component.

Because of the limited ability of the human eye to visually distinguish continuous linear changes in hue, saturation or lightness, discrete, nonlinear changes which the eye can distinguish are preferred. For example, one hue can be selected to represent a range of values of the variable $\theta$, e.g., 15°. Similarly, it has been found preferable to employ discrete, logarithmical scales for lightness and saturation. Additionally, the range of values for saturation and lightness should be truncated so as to avoid extremes (i.e., minimum and maximum) in either saturation or lightness.

Figure 6:
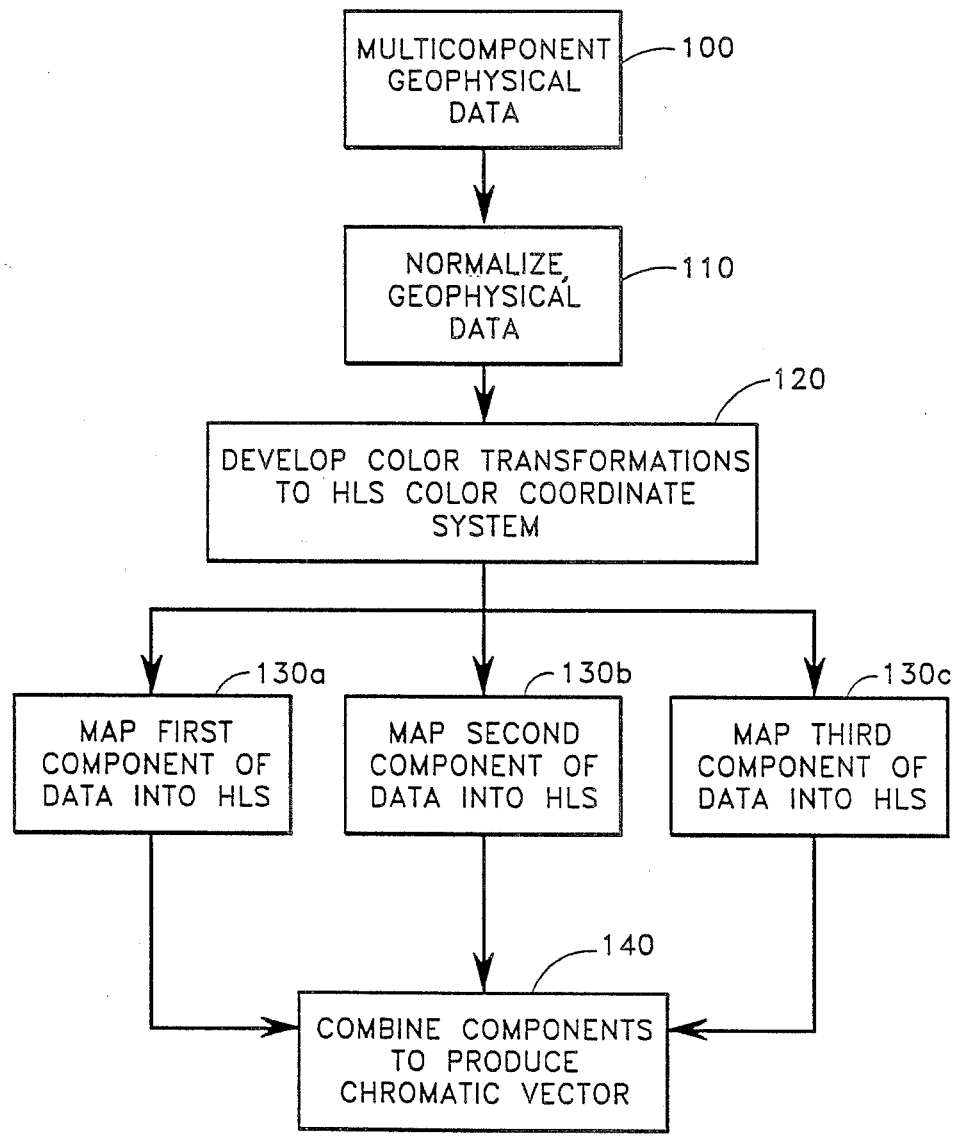
FIG. 6 is a flow diagram of the present invention.

A more detailed description of the method for producing continuous color displays of multicomponent geophysical data is now provided. To aid in this discussion, a flow diagram of the present invention is depicted in FIG. 6. The multicomponent geophysical data which are to be mapped as continuous color displays are collected at 100. The multicomponent geophysical data can then be normalized at 110, such that the magnitude of the data ranges in value from a minimum of zero to a maximum of ±1. Such normalization can be global, whereby the maximum value of any component of the multicomponent geophysical data is employed to normalize the entire data set. This approach assures that relative measures of the multicomponent geophysical data are preserved. Alternatively, such normalization can include nonlinear scaling whereby each separate component of the multicomponent data is scaled. Such an approach can be especially useful when producing continuous color displays from seismic data sets in which differences in maximum values for each component can be large. Such scaling factors can also be employed to overcome the limitations of the human eye to distinguish linear changes in hue, saturation or lightness.

At step 120, a set of color transformations are developed to map each component of the multicomponent geophysical data into a selected HLS color coordinate system.

At steps 130a, b, and c, each component of the multicomponent geophysical data is mapped in the HLS color coordinate system, employing the color transformations.

At step 140, a chromatic vector is produced from the components of the data mapped into the HLS color coordinate system and color displays of the chromatic vector representative of the combination of two or more components of the multicomponent data can be produced. Such color displays can represent any two components of the multicomponent geophysical data or all three components of the multicomponent geophysical data.

A novel method for producing color displays of multicomponent geophysical data has been described which overcomes the limitations of prior methods. While the continuous color displays provided herein were developed on a color monitor of a computing system, those skilled in the art will appreciate that such continuous color displays can also advantageously be displayed on color printers. Additionally, combinations of the seismic data provided herein have been shown as the result of chromatic vector addition; however, those skilled in the art will appreciate that combinations of seismic data can be achieved through chromatic vector subtraction. Other modifications and variations of the described color coordinate system transformations are nevertheless contemplated to fall within the scope of the claims provided.

We claim:

1. A method for color mapping of multi-component geophysical data, comprising the steps of:
   (a) developing a set of color transformations for uniquely mapping both the positive and negative values of each component of the multicomponent geophysical data in an HLS color coordinate system so as to preclude the existence of two or more different combinations of the compounds of the multicomponent geophysical data having the same coordinates in the HLS coordinate system, wherein the set of color transformations comprising transformations according to:

$\overline{U}_1 = Z$;

$\overline{U}_2 = R \sin \theta$; and $\overline{U}_3 = R \cos \theta$, where $\overline{U}_1, \overline{U}_2, \overline{U}_3$ are separate components of the multicomponent geophysical data; $Z, R, \theta$ are components of the HLS color coordinate system; and $R = (\overline{U}_2^2 + U_3^2)^{\frac{1}{2}}; \theta = \tan^{-1} \frac{\overline{U}_2}{\overline{U}_3}$;

and
   (b) mapping the positive and negative values of each component of the multicomponent geophysical data in the HLS color coordinate system with the color transformations.

2. The method of claim 1 wherein the Z component of the HLS color coordinate system is representative of variations in lightness; the R component of the HLS color coordinate system is representative of variations in saturation; and the $\theta$ component of the HLS color coordinate system is representative of variations in hue.

3. The method of claim 1 wherein the components of the multicomponent geophysical data can be selected from the group comprising compressional (P) seismic data, horizontal shear (SH) seismic data, and vertical shear (SV) seismic data.

4. The method of claim 1 wherein $\overline{U}_1$ represents the compressional (P) component of the multicomponent geophysical data, $\overline{U}_2$ represents the horizontal shear (SH) component of the multicomponent geophysical data; and $\overline{U}_3$ represents the vertical shear (SV) component of the multi-component geophysical data.

5. The method of claim 2 wherein only two components of the multicomponent geophysical data are to be mapped, a fixed value of lightness (Z) is selected and variations in the two components are represented by variations in saturation (R) and hue ($\theta$).

6. The method of claim 2 wherein variations in hue (H) are represented by measures of an azimuthal angle $\theta$ about a longitudinal axis of the HLS cylindrical color coordinate system; variations in lightness (L) are represented by a distance Z measured along the longitudinal axis from an origin depicted as gray in which lightness change toward white in one direction along the longitudinal axis and toward black along the opposite direction; and variations in saturation (S) are represented by a radial distance R measured from the longitudinal axis whereby the saturation varies from 100% gray along the longitudinal axis to 0% gray.

7. The method of claim 1 further including the steps of:
   (a) combining at least two of the components of the multicomponent geophysical data mapped into the HLS color coordinate system by chromatic vector addition; and
   (b) producing unique color displays of components of the multicomponent geophysical data combined by chromatic vector addition.

8. A method for combining at least two components of multicomponent geophysical data, comprising the steps of:
   (a) developing a set of color transformations for uniquely mapping both positive and negative values of each component of the multicomponent geophysical data in an HLS color coordinate system so as to preclude the existence of two or more different combinations of the components of the multicomponent geophysical data having the same coordinates in the HLS color coordinate system, wherein the set of color transformations comprises transformations according to:

$\overline{U}_1 = R \sin \theta$; and $\overline{U}hd 2 = R \cos \theta$, where $\overline{U}_1, \overline{U}_2$ are separate components of the multicomponent geophysical data; $R, \theta$ are components of the HLS color coordinate system; and $R = (\overline{U}_2^2 + U_3^2)^{\frac{1}{2}}; \theta = \tan^{-1} \frac{\overline{U}_2}{\overline{U}_3}$;

(b) mapping the positive and negative values for at least two components of the multicomponent geophysical data in the HLS color coordinate system with the color transformations; and (c) combining the components mapped into the HLS color coordinate system by chromatic vector addition.

9. The method of claim 8 further including the step of:

producing unique color displays of the components of the multicomponent geophysical data combined by chromatic vector addition.

10. A method for displaying seismic data containing two or more separate components of seismic wave propagation, comprising the steps of:

(a) developing a set of color transformations for uniquely mapping both positive and negative values of each component of the multicomponent seismic data in an HLS color coordinate system so as to preclude the existence of two or more different combinations of the components of the multicomponent geophysical data having the same coordinate in the HLS color coordinate system, wherein the set of color transformations comprises transformations according to:

$$\overline{U}_1 = R \sin \theta; \text{ and}$$

$$\overline{U}_2 = R \cos \theta,$$

where $\overline{U}_1, \overline{U}_2$, are separate components of the multicomponent geophysical data; $R, \theta$ are components of the HLS color coordinate system; and $$R = (\overline{U}_2^2 + \overline{U}_3^2)^{\frac{1}{2}}; \theta = \tan^{-1} \frac{\overline{U}_2}{\overline{U}_3};$$

(b) mapping both the positive and negative values of at least two components of the multicomponent seismic data in the HLS color coordinate system with the color transformations;

(c) producing a chromatic vector representative of a combination of the components of the multicomponent seismic data; and (d) producing color displays of the chromatic vector.

* * * * *

UNITED STATES PATENT AND TRADEMARK OFFICE
CERTIFICATE OF CORRECTION

PATENT NO. : 4,970,699

DATED : November 13, 1990

INVENTOR(S) : Bucker, et al.

It is certified that error appears in the above--identified patent and that said Letters Patent is hereby corrected as shown below:

Column 8, line 56, "$\bar{U}hd\ 2 = R\cos\theta$", should read --$\bar{U}_2 = R\cos\theta$--.

Column 8, line 65 --$R = (\bar{U}_2^2 + \bar{U}_3^2)^{1/2}$; $\theta = \tan^{-1}\dfrac{\bar{U}_2}{\bar{U}_3}$; |

--$R = (\bar{U}_2^2 + \bar{U}_3^2)^{1/2}$; $\theta = \tan^{-1}\dfrac{\bar{U}_2}{\bar{U}_3}$;--.

Signed and Sealed this

Tenth Day of November, 1992

*Attest:*

DOUGLAS B. COMER

*Attesting Officer*     *Acting Commissioner of Patents and Trademarks*